Figure 1:
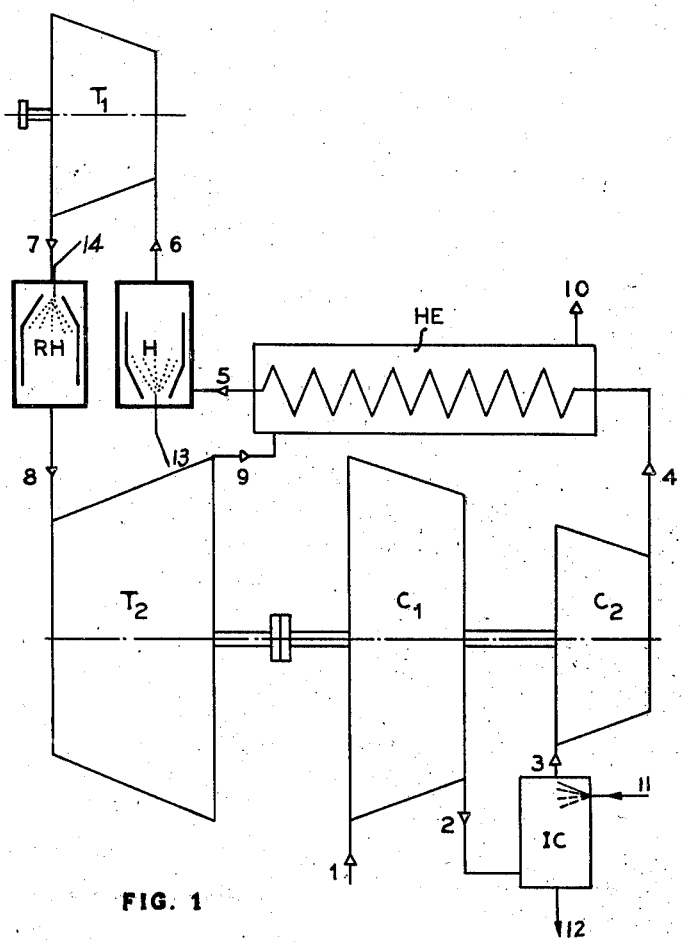

Patented Sept. 3, 1946

2,407,165

UNITED STATES PATENT OFFICE 2,407,165

METHOD AND MEANS FOR IMPROVING POWER PRODUCTION IN COMBUSTION TURBINES

Johann Kreitner, New York, and Frederick Nettel, Manhasset, N. Y.

Application June 21, 1941, Serial No. 399,242

15 Claims. (Cl. 60—41)

The present invention deals with power systems in which a gaseous medium, preferably air, is in a continuous stream compressed, heated thereafter, and expanded in machines developing mechanical power. The expansion machines may be turbines, or a combination of turbines and expansion engines. The invention applies generally to both the closed and the open cycles, i. e. cycles where the same circulating working medium is re-compressed after expansion, and cycles where air is taken in from, and, after performing the cycle, exhausted into the ambient atmosphere, respectively. In particular it is preferred to apply the disclosure to open cycles which are better suited to fulfill the requirements, and bring forth all the advantages of the invention.

The broad object of this invention is to assist the designer of power systems of the mentioned types to select the basic thermodynamic data in a certain quantitative inter-relation which results in overall thermal efficiencies hitherto unattained in this field of power generation. This is achieved by purposeful quantitative co-ordination of individual measures qualitatively known in the art, such as inter-cooling, regenerative pre-heating, re-heating, etc.

The possibility for such co-ordination has been created by the applicants' discovery of a network of inherent optimum relations hidden in power systems of the general type mentioned, and the derivation of rules therefrom. These rules teach how to employ any contemplated measure to such extent and in such place where its advantage for the cycle as a whole is greatest. In addition, these rules teach how to co-ordinate several measures of different kind in the most advantageous way. Finally they permit to discern among various contemplated arrangements which is the thermodynamically best suited type. These laws were hitherto unknown in the art, and they set a planful quantitative co-ordination of all individual steps and measures in the place of the hit and miss procedure which so far has guided the thermal lay-out of combustion turbine power systems.

The present art proposes certain arrangements of combustion turbine plants mostly from the design viewpoint. Where thermal considerations prevail, measures are frequently proposed to improve certain parts of the thermal cycle individually, without a comprehensive consideration of how the measure influences the rest of the cycle. Thus there are steps claimed as advantageous in the present art which improve one sector of the thermal cycle, but harm the cycle as a whole. The lack of a thorough thermodynamical comprehension of the various proposed combustion turbine cycles is striking even in leading disclosures on this subject, and sometimes results in thermodynamical absurdities, as will be shown in an example as the description proceeds.

Guiding thermodynamic laws for best working conditions have for the first time been revealed by the applicants, and are disclosed in the present application. Mathematical relations have been found of how any measure affects the whole of the cycle, and in which relation to the other cycle data any individual measure must be applied to give the optimum effect. Through rules derived therefrom the designer is enabled to combine any number of different measures, such as pre-cooling, inter-cooling, regenerative pre-heating, variation of total compression ratio, sub-division of working quantity or working pressure, reheating, etc., each one under its respective optimum condition in co-operation with all other measures, thereby realizing an astounding improvement in overall efficiency, as will be later sown in a numerical example. For such co-ordination the mathematical relations herein disclosed are indispensible, since it is obvious that the joint optimum of half a dozen or more simultaneous measures can neither be found by hit and miss, nor by the trial and error method, which latter would require an enormous number of trial calculations.

The above statement about the insufficiency of the present art as regards a thorough thermodynamical comprehension of the combustion turbine cycles shall be substantiated by one example:

In the preent art of air compression it is known that inter-cooling reduces the power consumption of the compressor. Any bit of inter-cooling helps, wherever it is done. Thus it is known in the axial flow type of compressors, to cool the air inside the compressor after every row of blades, resulting in a continuous cooling from intake to outlet, the ideal being what is called isothermic compression. Such continuous cooling has been faithfully adopted for combustion turbine cycles too, and been calimed as advantageous, since it reduces the compression work.

In a combustion turbine cycle, however, the air must be heated after compression. Extending the continuous cooling up to immediately before, or even after, the last stage of the compressor, as it is being practised in the present art, means cooling the air where it should be heated. Cooling the last compressor stage reduces the compression work by just a trifle, but harms the overall efficiency by much more, because every heat unit carried away by the cooling water must immediately afterwards be replaced by fuel heat.

The applicant's research has shown that inter-cooling during compression in the art of power generation by combustion turbines has to follow requirements quite different from the art of air compression. Inter-cooling to a certain temperature in a power cycle has widely different effects depending on where it is applied: Near the compressor intake it helps the cycle as a whole, to a very small extent though, because the air still contains very little compression heat to be cooled away. Further on the benefit of local inter-cooling increases from stage to stage. At about one third of the total compression ratio it reaches a maximum, after which the benefit from local inter-cooling begins to decline. At approximately two thirds of the total compression ratio benefit changes to detriment, and within the last third of the compressor any inter-cooling harms, the further on the more. The reason is, that the small gain in compression work inside the last few stages is outweighed by the increase in fuel input necessary to make up for the too late cooling. The exact location of the points just referred to as approximately one third and two thirds of the total compression ratio depends matematically on the size of the heat exchanger employed, and on other data selected for the cycle, as will be shown as the description proceeds.

Thus the present disclosure teaches to forego cooling throughout all of the compression as contradictory to the very thermal principles of the cycle, and to concentrate inter-cooling at one or several points, or within a stretch, where its effect is greatest. Calculation shows that much greater benefit for the cycle as a whole can be derived from cooling means of a certain given heat rejecting capacity if they are concentrated near the optimum point as disclosed in this invention, than by spreading them out over the entire compression.

The present art also knows inter-cooling concentrated at one point, but this measure has been adopted for design convenience rather than for thermodynamical reasons, thus leaving the question where to inter-cool to be determined by more or less secondary structural considerations. As distinct therefrom the present disclosure gives the proper place for the most effective inter-cooling as a definite function of the air temperatures, the efficiencies of compressors and turbines, and the size of the regenerative heat exchanger employed.

Similar examples as to the insufficiency of the present art could be given, and similar new principles have been discovered by the applicants, for the re-heating of the working medium during expansion, known as such but not properly co-ordinated into the cycle so far, and for various other measures.

It is another object of this invention to enable the operator of such power systems to adjust the plant to optimum working conditions if one or several of the cycle data, such as air temperature, cooling water temperature, heating temperature, pressure, etc., vary due to climatic influences, influences of varying altitude in vehicles, and/or influences of load and speed regulation.

For achieving these and other objects the present invention reveals that all cycle data in a power system of the type mentioned are directly or indirectly inter-woven into a network of optimum conditions; but that these relations do not express themselves in terms of inlet temperatures to the compression and expansion machines, nor in terms of pressures. Contrary to what one would expect, the optimum conditions appear in the form of relations between the outlet temperatures from the compression and expansion machines, that is, in the form of the inlet temperatures to the heat exchanging parts of the equipment such as inter-coolers, heat exchanger, and heaters.

In the following relations $T'_2$ denotes the absolute temperature of the partly compressed air at the inlet to an inter-cooler between two stages of compression;

$T_4$ denotes the absolute temperature of the compressed air at the inlet to the heat exchanger;

$T_7$ denotes the absolute temperature of the partly expanded working medium at the inlet to a re-heater between two stages of expansion;

$T_9$ denotes the absolute temperature of the expanded working medium at the inlet to the heat exchanger;

$e_c$ denotes the internal efficiency of compression, (adibatic compressor efficiency);

$e_e$ denotes the internal efficiency of expansion, (turbine or engine efficiency);

$e$ denotes the thermal overall efficiency of the cycle, as determined by the ratio of the heat equivalent of useful power output to the fuel heat input;

$k$ denotes the heat transfer factor ("efficiency") of the heat exchanger as determined by the ratio $$k = \frac{T_5 - T_4}{T_9 - T_4}$$

where $T_5$ is the absolute temperature of the compressed air at the outlet from the heat exchanger.

With the above notations, the present invention discloses in its most general form the optimum working condition of power systems of the mentioned type by the relation $$T'_2 \cdot \frac{1 - 0.20 \cdot e \cdot k}{e_c \cdot e_e} = T_4 \cdot \frac{1 - e \cdot (1 - 0.85 \cdot k)}{e_c \cdot e_e} =$$

$$T_7 \cdot (1 - 0.97 \cdot e) = T_9 \cdot (1 - 0.97 \cdot e \cdot k)$$

The favorable effect of such relations is not strictly confined to values mathematically fulfilling the equations, but is maintained within a range of about ±6 per cent of the absolute temperatures; thus, according to the invention none of the absolute temperatures involved in any mathematical relation shall deviate more than six per cent from a corresponding value that fulfills the equation exactly. The sign ∼ employed in the following formulae is to be understood in this manner.

In particular, the new optimum relations determine—

(a) The best size of the first stage, or any stage, of compression which is followed by an inter-cooler, by co-ordinating the inlet temperature to said inter-cooler or inter-coolers to the inlet temperature of the expanded working medium to the heat exchanger, by $$\frac{T'_2}{T_9} \sim e_c \cdot e_e \cdot \frac{1 - 0.97 \cdot e \cdot k}{1 - 0.20 \cdot e \cdot k} \quad (1)$$

(b) The proper location of an inter-cooler, or any number of inter-coolers, within a given total compression ratio, by co-ordinating the inlet temperature to said inter-cooler or inter-coolers to the inlet temperature of the compressed air to the heat exchanger, by $$\frac{T_2'}{T_4} \sim \frac{1-e.(1-0.85.k)}{1-0.20.e.k} \quad (2)$$

(c) The best working condition for a regenerative heat exchanger, by co-ordinating the inlet temperature of the compressed air to said heat exchanger to the inlet temperature of the expanded working medium to said heat exchanger, by $$\frac{T_4}{T_9} \sim e_c.e_e.\frac{1-0.97.e.k}{1-e.(1-0.85.k)} \quad (3)$$

(d) The proper location of a re-heater, or any number of re-heaters, within a given total expansion ratio, by co-ordinating the inlet temperature to said re-heater or re-heaters to the inlet temperature of the expanded working medium to the heat exchanger, by $$\frac{T_7}{T_9} \sim \frac{1-0.97.e.k}{1-0.97.e} \quad (4)$$

(e) The best co-operation between an inter-cooler and a re-heater, or any number of inter-coolers and re-heaters operating in the same cycle, by co-ordinating the inlet temperature to the inter-cooler or inter-coolers to the inlet temperature to the re-heater or re-heaters, by $$\frac{T_2'}{T_7} \sim e_c.e_e.\frac{1-0.97.e}{1-0.20.e.k} \quad (5)$$

(f) The best co-operation between a regenerative heat exchanger and a re-heater, or any number of re-heaters, by co-ordinating the inlet temperature of the compressed air to said regenerative heat exchanger to the inlet temperature to said re-heater or re-heaters, by $$\frac{T_4}{T_7} \sim e_c.e_e.\frac{1-0.97.e}{1-e.(1-0.85.k)} \quad (6)$$

These rules apply to arrangements with one inter-cooling and/or one re-heating as well as to multiple inter-cooling and/or re-heating. In the latter case all inter-coolers and re-heaters, respectively, have to follow the same temperature rules. The formulae supply the optimum working conditions for any given value of the heat transfer factor $k$, including the value $k=0$, which represents a plant without a heat exchanger.

The same research has also led to optimum conditions for dimensions of the heat exchanger which co-ordinate the heat transfer in the heat exchanger to the pressure losses of the flow that causes said heat transfer, in such manner that the beneficial influence on cycle efficiency of the heat transfer, and the detrimental influence of the pressure losses, are combined into the maximum possible thermal efficiency of the whole cycle. The respective formulae, however, are less simple than those given above, and therefore less suitable to serve as design rules, or rules of operation. But within practical ranges of operation they can be approximated by the rule that the relative pressure drop inside said heat exchanger, i. e. the difference between inlet and outlet pressure, divided by the arithmetic means of said absolute pressures, shall remain within ¾ and 1¼ per cent on the side of the compressed air, and between 1¼ and 1¾ per cent on the side of the expanded working medium.

It is another object of this invention to use the optimum relations for selecting arrangements which combine high efficiency with an extraordinary high energy concentration. By energy concentration we mean the useful power, or rather its heat equivalent, per pound of air flowing through the cycle. Since the size of all machines and apparatus involved is primarily determined by the quantity of air to be handled per hour, higher energy concentration results in less weight, space, and cost per shaft horsepower, which is of particular importance in vehicles.

In this respect the optimum relations lead to a quantitatively pre-determined arrangement of several compressors working on the same shaft or on separate shafts, co-operating with several turbines working on the same shaft or, preferably, on separate shafts, all the compressors and turbines being arranged in series as regards the flow of the working medium. If in such series arrangement the compressors and turbines are dimensioned according to the temperature rules given hereinbefore, inter-cooling between the compressors, and re-heating between the turbines yields an energy concentration 100 to 200 per cent in excess of the so-called straight Brayton cycle, which is a cycle consisting of only one compressor and one turbine. This is accomplished without unduly complicating the arrangement, and without using higher temperatures than in the compared Brayton cycle, or unpleasantly high pressures. In other words, a co-ordinated series arrangement according to the present invention yields two to three times more useful work out of one pound of air flowing through the power system than a Brayton cycle, and the weight per shaft horsepower is correspondingly reduced.

A characteristic feature of the present invention is the fact that the quantitatively co-ordinated combination of inter-cooling and re-heating leads to much higher total compression ratios than employed heretofore. In the present art the compression ratio of plants for relatively best efficiency ranges around four, even where inter-cooling or re-heating, respectively, is proposed. In cycles according to the present invention the optimum compression ratio lies between seven and twenty. Thus the energy concentration becomes correspondingly larger, and the size of the machines correspondingly smaller, and higher efficiency is obtained with a given size of the heat exchanger, (sq. ft. per shaft horsepower).

The present art knows of optimum relations only insofar as it states that for one given arrangement a certain total compression ratio should not be exceeded, lest the efficiency drop. It is from this incomplete analysis that the small ratios mentioned above originate. As distinct therefrom the present invention discloses that it is not the ratio of compression that matters, but only its end temperature.

For instance, for a given set of cycle data on the heating side, the rules according to the present invention require a certain compression end temperature $T_4$. The compression ratio is only one of the influences that contribute to said $T_4$, the others being compressor intake temperature, compressor efficiency, type of compression, whether uncooled or cooled, and the physical properties of the compressed medium.

If, for example, the intake temperature to an uncooled compressor rises from 60 to 90 deg. F., the best compression ratio would noticeably decrease, in order to maintain an unchanged compression end temperature. If, on the other hand, one inter-cooling were inserted, the compression ratio would have to be greatly increased in order to maintain a certain end temperature.

Thus it becomes clear that compression and expansion end temperatures are the guiding data, and that pressure ratios and other cycle data matter only insofar as they contribute to said end temperatures. Hence the conventional attempts to locate best working conditions on the basis of optimum compression ratios must of necessity be misleading, since they start from fixed assumptions about everything except the compression ratio. As distinct therefrom the present invention teaches to select not only the cycle data, but the entire lay-out of the power system as dictated by the optimum co-ordination of said guiding temperatures.

A cycle according to the present invention is described in the non-limiting example represented in Fig. 1:

At point 1 air is taken in from the ambient atmosphere and enters the compressor $C_1$, where it is near-adiabatically compressed. At point 2 the partly compressed warm air leaves the compressor $C_1$ and enters the inter-cooler IC, where most of the compression heat is rejected and carried away by cooling media, preferably cooling water which enters the cooler at 11, and is discharged at 12. At point 3 the partly compressed and cooled air leaves the inter-cooler and enters compressor $C_2$, where it is again near-adiabatically compressed to a higher pressure and temperature. At point 4 the warm compressed air leaves compressor $C_2$ and enters the low temperature side of the regenerative heat exchanger HE, where it is pre-heated by the transfer of waste heat from the exhaust gases of the cycle. At point 5 the compressed and pre-heated air leaves the heat exchanger and enters the fuel burning heater H, where it is further heated, up to the metallurgically permissible temperature, by internal or external combustion of fuel. The drawing shows a heater for the internal combustion of liquid fuel which is injected at 13.

At point 6 the compressed and heated air, (or air-gas mixture in the case of internal combustion), enters the high pressure turbine $T_1$, where it expands and develops mechanical power. At point 7 the partly expanded and therefore cooler medium leaves the turbine $T_1$ and enters the re-heater RH, where it is re-heated by combustion of fuel to the same temperature as in point 6, or to any other predetermined temperature. The drawing shows a re-heater for the internal combustion of liquid fuel which is injected at 14. At point 8 the re-heated medium enters the low pressure turbine $T_2$, where it expands to near atmospheric pressure and develops further mechanical power.

At point 9 the completely expanded medium leaves the turbine $T_2$ and enters the high temperature side of the heat exchanger HE, where it transfers part of its waste heat to the compressed air which enters at point 4. After this regenerative heat transfer, the medium is exhausted to the atmosphere at point 10.

The mechanical connection in the shown example is such that the high pressure turbine $T_1$ supplies useful power to a power consuming device (not shown in the figure), while a second set on a separate shaft consists of the low pressure turbine $T_2$ driving the two compressors $C_1$ and $C_2$. Consequently the output of turbine $T_2$ must equal the sum of the compression work in $C_1$ and $C_2$. For this purpose the turbine $T_2$ consumes a certain portion of the total available expansion ratio at its lower end, while the remainder of the expansion ratio is utilized for developing useful power in turbine $T_1$.

In order to clearly show the inter-relation of all cycle data according to the present invention, and to prove the efficiency thereby attained, said data are hereafter numerically listed for one example of a power system of the type described:

| At the points— | The pressures in lb./sq. in. are— | The temperatures in deg. F. are— | The absolute temperatures in abs. deg. F. are— |
| --- | --- | --- | --- |
| 1 | 14.7 | 59 | 519 |
| 2 | 39.7 | 262 | 722 |
| 3 | 39.5 | 77 | 537 |
| 4 | 111 | 297 | 757 |
| 5 | 110 | 715 | 1,175 |
| 6 | 109.8 | 1,200 | 1,660 |
| 7 | 49 | 916 | 1,376 |
| 8 | 48.8 | 1,200 | 1,660 |
| 9 | 14.9 | 803 | 1,263 |
| 10 | 14.7 | 397 | 857 |

Thus ambient air is taken in at 14.7 lb./sq. in. and 59 deg. F., (point 1), compressed to 39.7 lb./sq. in., whereby it heats up to 262 deg. F., (point 2), cooled to 77 deg. F., (point 3), further compressed to 111 lb./sq. in., (point 4), pre-heated by regenerative heat exchange to 715 deg. F., (point 5), heated further by combustion of fuel to 1200 deg. F., which is about the limit of the present metallurgic art, (point 6), partly expanded in the useful power turbine to 49 lb./sq. in., whereby it cools to 916 deg. F., (point 7), re-heated to 1200 deg. F. (point 8), fully expanded to 14.9 lb./sq. in. in the compressor driving turbine, whereby it cools to 803 deg. F., (point 9), and cooled further to 397 deg. F. by transferring heat to the compressed air in the heat exchanger.

The internal efficiency of the turbines between points 6—7, and 8—9, respectively, is assumed 88 percent, and the internal efficiency of the compressors between points 1—2, and 3—4, 84.5 and 84 per cent respectively, corresponding to the values measured in the Neuchatel, Switzerland, combustion turbine plant; (see "Engineering," January 5, 1940, vol. 149). The heat exchange factor $k$ of the heat exchanger, as defined hereinbefore, is assumed 0.825, which can be obtained with a moderately sized heat transfer surface of slightly over three sq. ft. per shaft horsepower, if the heat exchanger is dimensioned according to the present invention so that the pressure drop is about 1 per cent between points 4—5, and about 1½ per cent between points 9—10.

Also for the coolers and heaters ample allowance has been made for pressure drops as experienced in actual operation, as may be seen from the above table, so that the tabulated data represent conditions readily realizable in practical operation.

With these data, the heat equivalent of the useful power appears as 72.5 B. t. u./lb. from the temperature difference in points 6 and 7, and the fuel heat input appears as 126 B. t. u./lb. in heater H (points 5—6), and 72.5 B. t. u./lb. in re-heater RH, (points 7—8).

Thus the thermal overall efficiency of the described cycle is $$e = \frac{72.5}{126 + 72.5} = 0.365$$

Such efficiency, corresponding to a standard fuel consumption 0.386 lb. per shaft horsepower hour, is so far in excess of anything the present art held possible with metallurgically permissible heating temperatures and moderate size of the heat exchanger, that the wide practical importance of the present invention is evident. This invention permits reaching with simple combustion turbine plants the efficiency of good Diesel engines, but at the same time avoiding the latter's structural complications and limitations in output.

Simultaneously with this increase in efficiency, the output from one pound of air per hour flowing through the cycle has been boosted to 72.5 B. t. u., as compared with figures around or under 40 B. t. u./lb. which the conventional Brayton cycle would yield under identical external conditions. In arrangements according to the invention the energy concentration can be further increased to over 100 B. t. u./lb. if more than one inter-cooler and re-heater are employed.

These advantages are attained by co-ordinating the cycle data according to the rules given hereinbefore. In the above numerical example the temperature rules yield the proportion $$T'_2 : T_4 : T_7 : T_9 = 100 : 106 : 197 : 180$$

The actual absolute temperatures, as they appear in the example, are $$722 : 757 : 1376 : 1263$$

and they correspond to the proportion well within ±6 per cent of each absolute temperature. Deviations from this relation, for example by arranging the compressor driving turbine on the high pressure side, would lower the efficiency.

Also the heat exchanger in the numerical example follows the rules disclosed in the present invention. The lengths of the ducts and the velocities therein are assumed such that the relative pressure drop on the side of the compressed air is $$\frac{111-110}{\frac{1}{2}.(111+110)} = 0.009$$

and the relative pressure drop on the side of the expanded medium is $$\frac{14.9-14.7}{\frac{1}{2}.(14.9+14.7)} = 0.0137$$

which is within the range of from ¾ to 1¼ per cent, and from 1¼ to 1¾ per cent, respectively.

Pressure losses as high as from one to three lb./sq. in., as they result from the rules herein disclosed, have in the present art been considered as intolerable for a heat exchanger in a combustion turbine plant. The research of applicants has however shown that, if a power system is properly laid out according to the temperature rules given above, pressure drops on the compressed air side of the heat exchanger up to 1¼ per cent of the highest air pressure in the system are advantageous for efficiency, since their beneficial influence on heat transfer still outweighs the loss incurred by the reduced expansion ratio of the turbines.

Embodiments of the present invention are not limited to arrangements on two shafts. In certain cases all turbines and compressors may be arranged on one shaft only; in other cases, particularly in vessels, it may be desirable to subdivide the power system into units on three or even more separate shafts. It is only essential that the design and connection of the individual stages be so as to fulfill at least one of the temperature rules given above.

In power systems which must frequently operate with other than the rated output, the arrangement should preferably be such as to also permit compliance with the temperature rules under the operating conditions at reduced or increased output.

In carrying out the invention it is immaterial whether the compressors are of the flow or of the positive displacement type; the inter-coolers may be of the spray or of the surface type, or a combination of both; the heaters may operate by internal combustion of fuel, or by transferring the combustion heat of externally burned fuel through heating surfaces. It is also immaterial whether the inter-cooling and re-heating take place between stages of one structurally complete compressor or turbine, or between structurally independent part compressors and part turbines, having separate casings. From practical viewpoints the latter arrangement will probably be more advantageous in most cases.

In the present invention, however, the structural arrangement is essential only insofar as it incorporates the thermodynamic rules set forth hereinbefore.

Having now fully described our invention, we claim:

1. In a method to produce power from a continuous stream of a gaseous working medium by compressing it in a plurality of stages with intermediate cooling, pre-heating it thereafter by regenerative heat exchange, heating it thereafter by combustion of fuel, and expanding it to develop mechanical power, the step of inter-cooling said working medium where the absolute compression temperature reaches a definite fraction of the absolute expansion end temperature, according to $$\frac{T'_2}{T_9} \sim e_c.e_e.\frac{1-0.97.e.k}{1-0.20.e.k}$$

within a margin of plus or minus six per cent of the absolute temperatures, wherein $T'_2$ denotes the absolute temperature of the partly compressed working fluid at the outlet of an intermediate stage of compression means, $T_9$ the absolute temperature of the expanded working fluid at the outlet of the last stage of expansion means, $e_c$ the internal efficiency of compression, $e_e$ the internal efficiency of expansion, $e$ the thermal overall efficiency of the cycle, and $k$ the efficiency of regenerative heat transfer.

2. In a power system of the continuous combustion type, the combination of multistage compressing means, unthrottled conduit means, cooling means, heating means, and expansion means, said conduit means connecting the cooling means to the outlet of that stage of compressing means where the absolute temperature of the working fluid near full load operation exceeds a value substantially as $$T'_2 = T_9.e_c.e_e.\frac{1-0.97.e.k}{1-0.20.e.k}$$

wherein $T'_2$ denotes the absolute temperature of the partly compressed working fluid at the outlet of an intermediate stage of compression means, $T_9$ the absolute temperature of the expanded working fluid at the outlet of the last stage of expansion means, $e_c$ the internal efficiency of compression, $e_e$ the internal efficiency of expansion, $e$ the thermal overall efficiency of the cycle, and $k$ the efficiency of regenerative heat transfer.

3. In a method to produce power from a continuous stream of a gaseous working medium by compressing it in a plurality of stages with intermediate cooling, pre-heating it thereafter by regenerative heat exchange, heating it thereafter by combustion of fuel, and expanding it to develop mechanical power, the step of inter-cooling said working medium where the absolute compression temperature reaches a definite fraction of the absolute compression end temperature, according to $$\frac{T'_2}{T_4} \sim \frac{1-e.(1-0.85.k)}{1-0.20.e.k}$$

within a margin of plus or minus six per cent of the absolute temperatures, wherein $T'_2$ denotes the absolute temperature of the partly compressed working fluid at the outlet of an intermediate stage of compression means, $T_4$ the absolute temperature of the compressed working fluid at the outlet of the last stage of compression means, $e$ the thermal overall efficiency of the cycle, and $k$ the efficiency of regenerative heat transfer.

4. In a power system of the continuous combustion type, the combination of multistage compressing means, unthrottled conduit means, cooling means, heating means, and expansion means, said conduit means connecting the cooling means to the outlet of that stage of compressing means where the absolute temperature of the working fluid near full load operation exceeds a value substantially as $$T'_2 = T_4 \cdot \frac{1-e.(1-0.85.k)}{1-0.20.e.k}$$

wherein $T'_2$ denotes the absolute temperature of the partly compressed working fluid at the outlet of an intermediate stage of compression means, $T_4$ the absolute temperature of the compressed working fluid at the outlet of the last stage of compression means, $e$ the thermal overall efficiency of the cycle, and $k$ the efficiency of regenerative heat transfer.

5. In a method to produce power from a continuous stream of a gaseous working medium by compressing it in a plurality of stages with intermediate cooling, pre-heating it thereafter by regenerative heat exchange, heating it thereafter by combustion of fuel, and expanding it to develop mechanical power, the step of compressing said working medium to such degree that the absolute compression end temperature $T_4$ at which the compressed working medium enters the heat exchanger is a definite fraction of the absolute expansion end temperature $T_9$ at which the expanded working medium enters the heat exchanger, according to $$\frac{T_4}{T_9} \sim e_c.e_e \cdot \frac{1-0.97.e.k}{1-e.(1-0.85.k)}$$

within a margin of plus or minus six per cent of the absolute temperatures, wherein $e_c$ denotes the internal efficiency of compression, $e_e$ the internal efficiency of expansion, $e$ the thermal overall efficiency of the cycle, and $k$ the efficiency of regenerative heat transfer.

6. In a power system of the continuous combustion type, having multistage compressing means and cooling means therefore, multistage expansion means and heating means therefore, the combination of uncooled end compressor means of such ratio with unheated end expansion means of such ratio that the absolute discharge temperatures $T_4$ and $T_9$ of both said means are substantially as $$T_4 = T_9.e_c.e_e \cdot \frac{1-0.97.e.k}{1-e.(1-0.85.k)}$$

wherein $e_c$ denotes the internal efficiency of compression, $e_e$ the internal efficiency of expansion, $e$ the thermal overall efficiency of the cycle, and $k$ the efficiency of regenerative heat transfer.

7. In a method to produce power from a continuous stream of a gaseous working medium by compressing it, pre-heating it thereafter by regenerative heat exchange, heating it thereafter by combustion of fuel, and expanding it to develop mechanical power in a plurality of stages with intermediate re-heating, the step of re-heating said working medium where the absolute expansion temperature $T_7$ has reached a definite multiple of the absolute expansion end temperature $T_9$ at which the expanded working medium enters the heat exchanger, according to $$\frac{T_7}{T_9} \sim \frac{1-0.97.e.k}{1-0.97.e}$$

within a margin of plus or minus six per cent of the absolute temperature, wherein $e$ denotes the thermal overall efficiency of the cycle, and $k$ the efficiency of regenerative heat transfer.

8. In a power system of the continuous combustion type, the combination of compressing means, unthrottled conduit means, waste heat recuperating means, multistage expansion means and heating and re-heating means therefore, said conduit means connecting re-heating means to the outlet of that stage of expansion means where the absolute temperature of the working fluid near full load operation drops below a value substantially as $$T_7 = T_9 \cdot \frac{1-0.97.e.k}{1-0.97.e}$$

wherein $T_7$ denotes the absolute temperature of the partly expanded working fluid at the outlet of an intermediate stage of expansion means, $T_9$ the absolute temperature of the expanded working fluid at the outlet of the last stage of expansion means, $e$ the thermal overall efficiency of the cycle, and $k$ the efficiency of regenerative heat transfer.

9. In a method to produce power from a continuous stream of a gaseous working medium by compressing it in a plurality of stages with intermediate cooling, heating it thereafter, and expanding it in a plurality of stages with intermediate re-heating, the step of inter-cooling and re-heating said working medium where the absolute compression temperature $T'_2$ and the absolute expansion temperature $T_7$ are co-ordinated by $$\frac{T'_2}{T_7} \sim e_c.e_e \cdot \frac{1-0.97.e}{1-0.20.e.k}$$

within a margin of plus of minus six per cent of the absolute temperatures, wherein $e_c$ denotes the internal efficiency of compression, $e_e$ the internal efficiency of expansion, $e$ the thermal overall efficiency of the cycle, and $k$ the efficiency of regenerative heat transfer.

10. In a power system of the continuous combustion type, having multistage compressing means and cooling means therefore, and multistage expansion means and heating and re-heating means therefore, the combination of cooling means connected to the outlet of that stage of compressing means where the absolute temperature of the working fluid near full load operation exceeds $T'_2$, and re-heating means connected to the outlet of that stage of expansion means where the absolute temperature of the working fluid near full load operation drops under $T_7$, said values being substantially as $$T'_2 = T_7.e_c.e_e \cdot \frac{1-0.97.e}{1-0.20.e.k}$$

wherein $e_c$ denotes the internal efficiency of compression, $e_e$ the internal efficiency of expansion, $e$ the thermal overall efficiency of the cycle, and $k$ the efficiency of regenerative heat transfer.

11. In a method to produce power from a continuous stream of a gaseous working medium by compressing it, pre-heating it thereafter by regenerative heat exchange, heating it thereafter by combustion of fuel, and expanding it to develop power in a plurality of stages with intermediate re-heating, that improvement which consists in re-heating said working medium where the absolute expansion temperature $T_7$ reaches a definite multiple of the absolute inlet temperature $T_4$ of the compressed working medium into the heat exchanger, according to $$\frac{T_7}{T_4} \sim \frac{1-e.(1-0.85.k)}{e_c.e_e.(1-0.97.e)}$$

within a margin of plus or minus six per cent of the absolute temperatures, wherein $e_c$ denotes the internal efficiency of compression, $e_e$ the internal efficiency of expansion, $e$ the thermal overall efficiency of the cycle, and $k$ the efficiency of regenerative heat transfer.

12. In a power system of the continuous combustion type, the combination of compressing means, unthrottled conduit means, waste heat recuperating means, heating and re-heating means, and multi-stage expansion means, said conduit means connecting re-heating means to the outlet of that stage of expansion means where the absolute temperature of the working fluid near full load operation drops below a value substantially as $$T_7 = T_4 . \frac{1-e.(1-0.85.k)}{e_c.e_e.(1-0.97.e)}$$

wherein $T_7$ denotes the absolute temperature of the partly expanded working fluid at the outlet of an intermediate stage of expansion means, $T_4$ the absolute temperature of the compressed working fluid at the outlet of the last stage of compression means, $e_c$ the internal efficiency of compression, $e_e$ the internal efficiency of expansion, $e$ the thermal overall efficiency of the cycle, and $k$ the efficiency of regenerative heat transfer.

13. In a method to produce power by taking a continuous stream of air in from the ambient atmosphere, compressing it in a plurality of stages with intermediate cooling, pre-heating it thereafter by transferring waste heat from the expanded working medium to the compressed air, heating it further by combustion of fuel before and during its expansion in a plurality of stages to develop power part of which serves to drive the air compressing means while the remainder is external useful power, that improvement which consists in operating the recuperating means and the re-heating means at absolute inlet temperatures coordinated by $$T_4 . \frac{1-e.(1-0.85.k)}{e_c.e_e} \sim T_7.(1-0.97.e) \sim T_9.(1-0.97.e.k)$$

within a margin of plus or minus six per cent of the absolute temperatures, wherein $T_4$ denotes the absolute temperature of the compressed working fluid where it enters the recuperating means, $T_7$ the absolute temperature of the partly expanded working fluid where it enters reheating means between stages of expansion, $T_9$ the absolute temperature of the expanded working fluid where it enters the recuperating means, $e_c$ the internal efficiency of compression, $e_e$ the internal efficiency of expansion, $e$ the thermal overall efficiency of the cycle, and $k$ the efficiency of regenerative heat transfer.

14. In a method to produce power by taking a continuous stream of air in from the ambient atmosphere, compressing it in a plurality of stages with intermediate cooling, pre-heating it thereafter by transferring waste heat from the expanded working medium to the compressed air, heating it further by combustion of fuel before and during its expansion in a plurality of stages to develop mechanical power, part of which serves to drive the air compressing means, while the remainder is external useful power, that improvement which consists in operating the recuperating means and the cooling means at absolute inlet temperatures co-ordinated by $$T'_2.(1-0.20.e.k) \sim T_4.(1-e.(1-0.85.k)) \sim T_9.e_c.e_e.(1-0.97.e.k)$$

within a margin of plus or minus six per cent of the absolute temperatures, wherein $T'_2$ denotes the absolute temperature of the partly compressed working fluid where it enters cooling means between stages of compression, $T_4$ the absolute temperature of the compressed working fluid where it enters the recuperating means, $T_9$ the absolute temperature of the expanded working fluid where it enters the recuperating means, $e_c$ the internal efficiency of compression, $e_e$ the internal efficiency of expansion, $e$ the thermal overall efficiency of the cycle, and $k$ the efficiency of regenerative heat transfer.

15. The method of, and the apparatus for, producing power at improved efficiency in systems of the type described by causing the absolute inlet temperature $T'_2$ to inter-cooling means, and the absolute inlet temperature $T_7$ to re-heating means to be related by $$\frac{T'_2}{T_7} \sim e_c.e_e.\frac{1-0.97.e}{1-0.20.e.k}$$

within a margin of plus or minus six per cent of the absolute temperatures, wherein $e_c$ denotes the internal efficiency of compression, $e_e$ the internal efficiency of expansion, $e$ the thermal overall efficiency of the cycle, and $k$ the efficiency of regenerative heat transfer.

JOHANN KREITNER.
FREDERICK NETTEL.